Oct. 4, 1960  F. C. CHOICE  2,954,595
MACHINES FOR OPERATING ON BLANKS OF CERAMIC WARE
Filed July 16, 1956  10 Sheets-Sheet 4
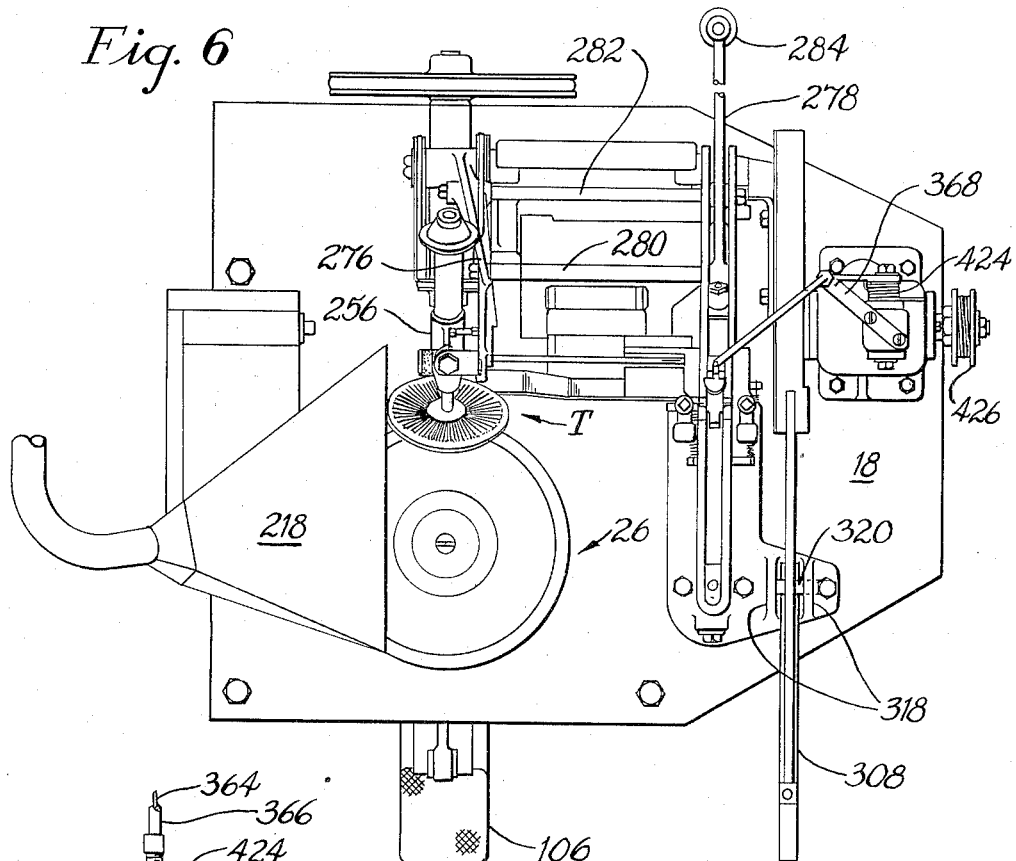
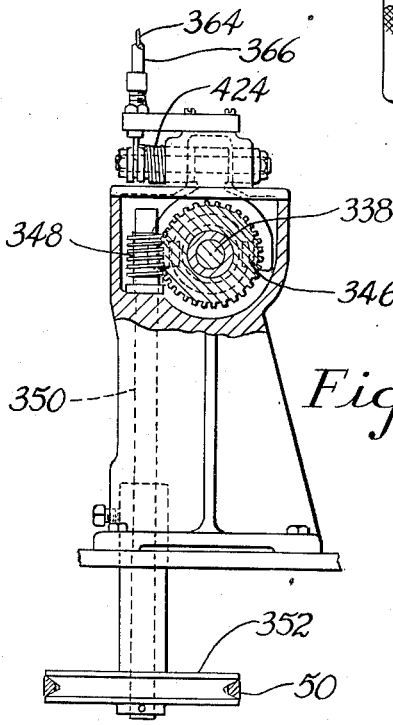
Inventor
Frank C. Choice
By his Attorney

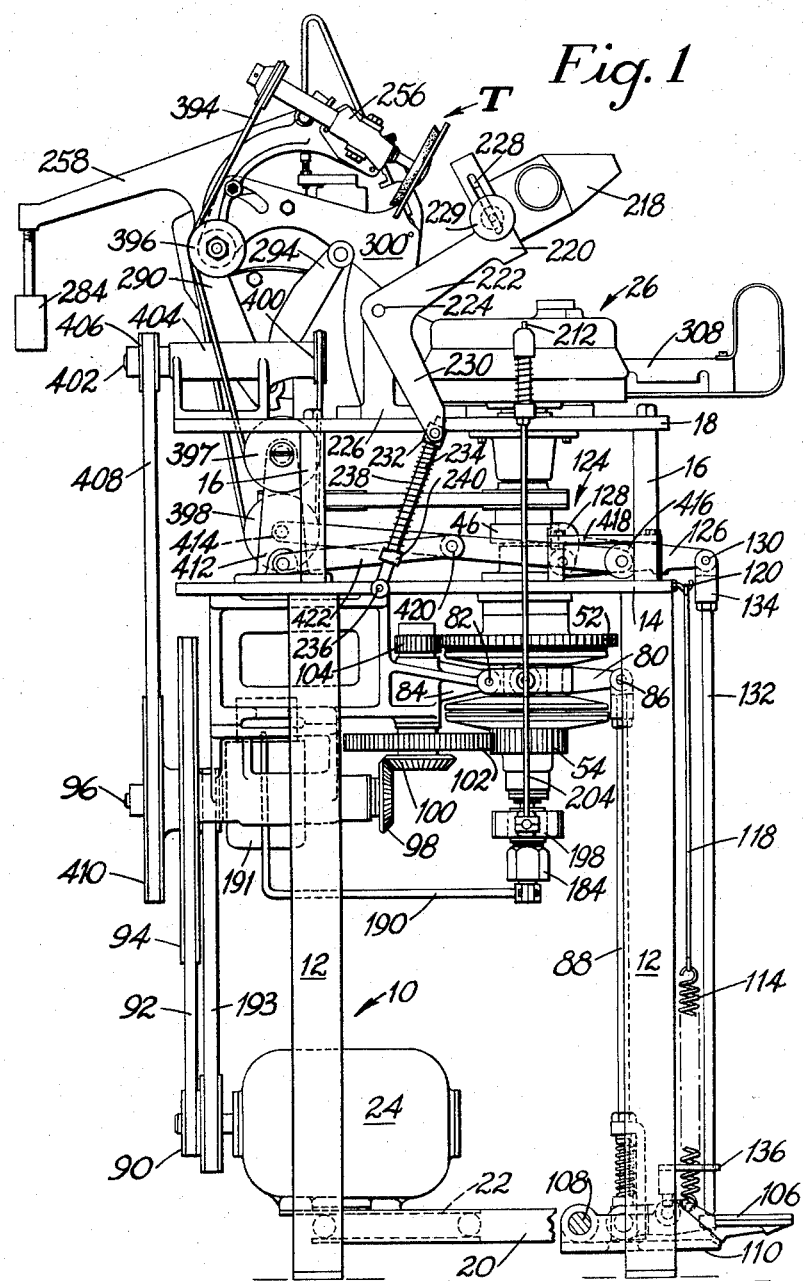

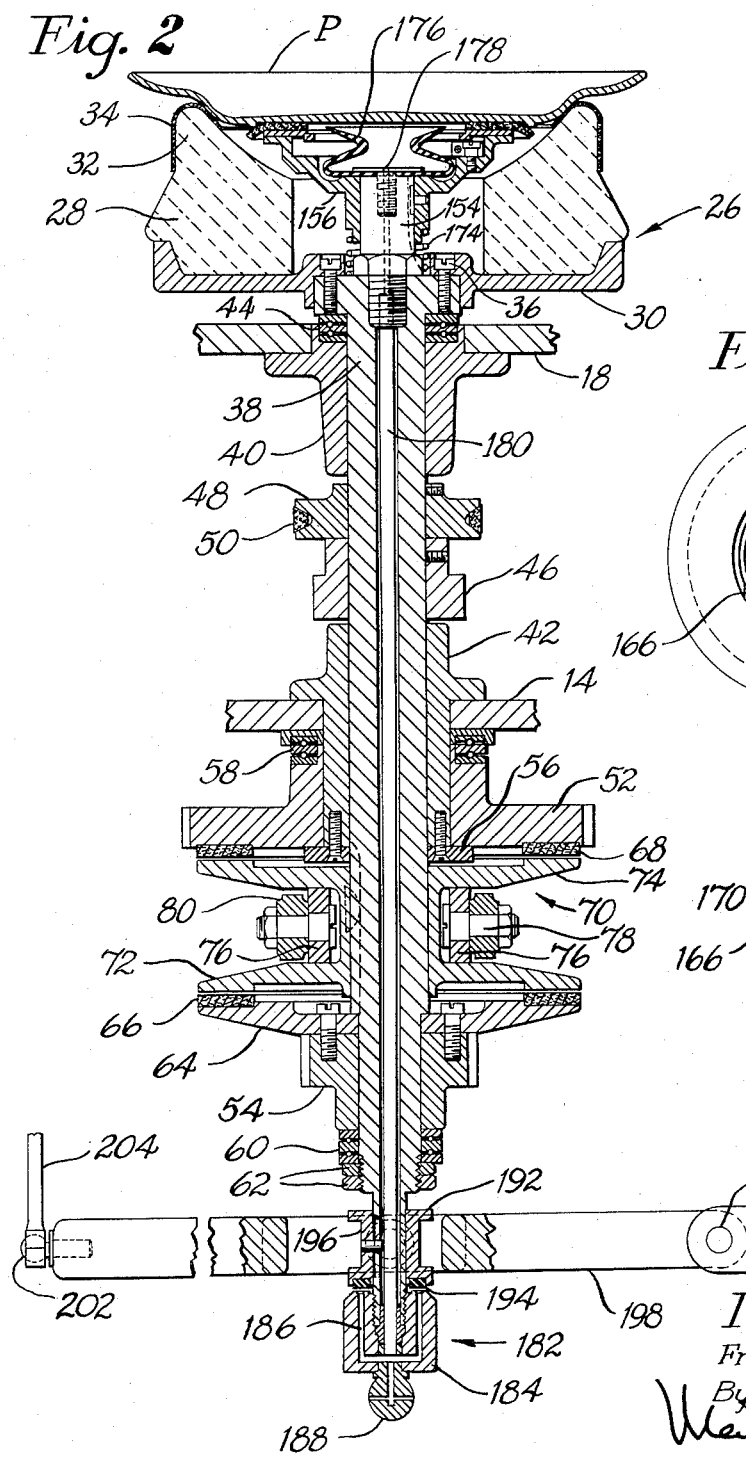

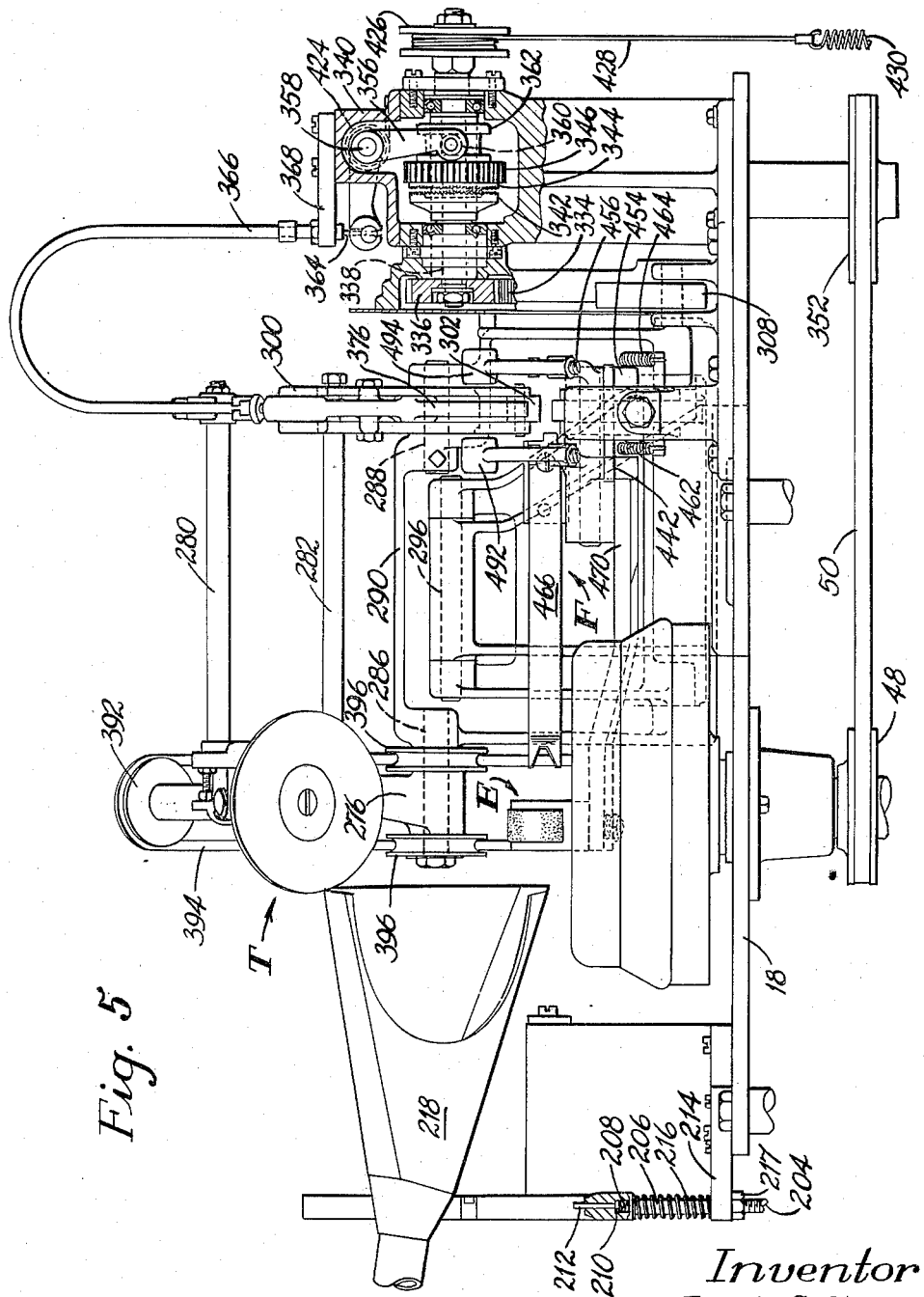

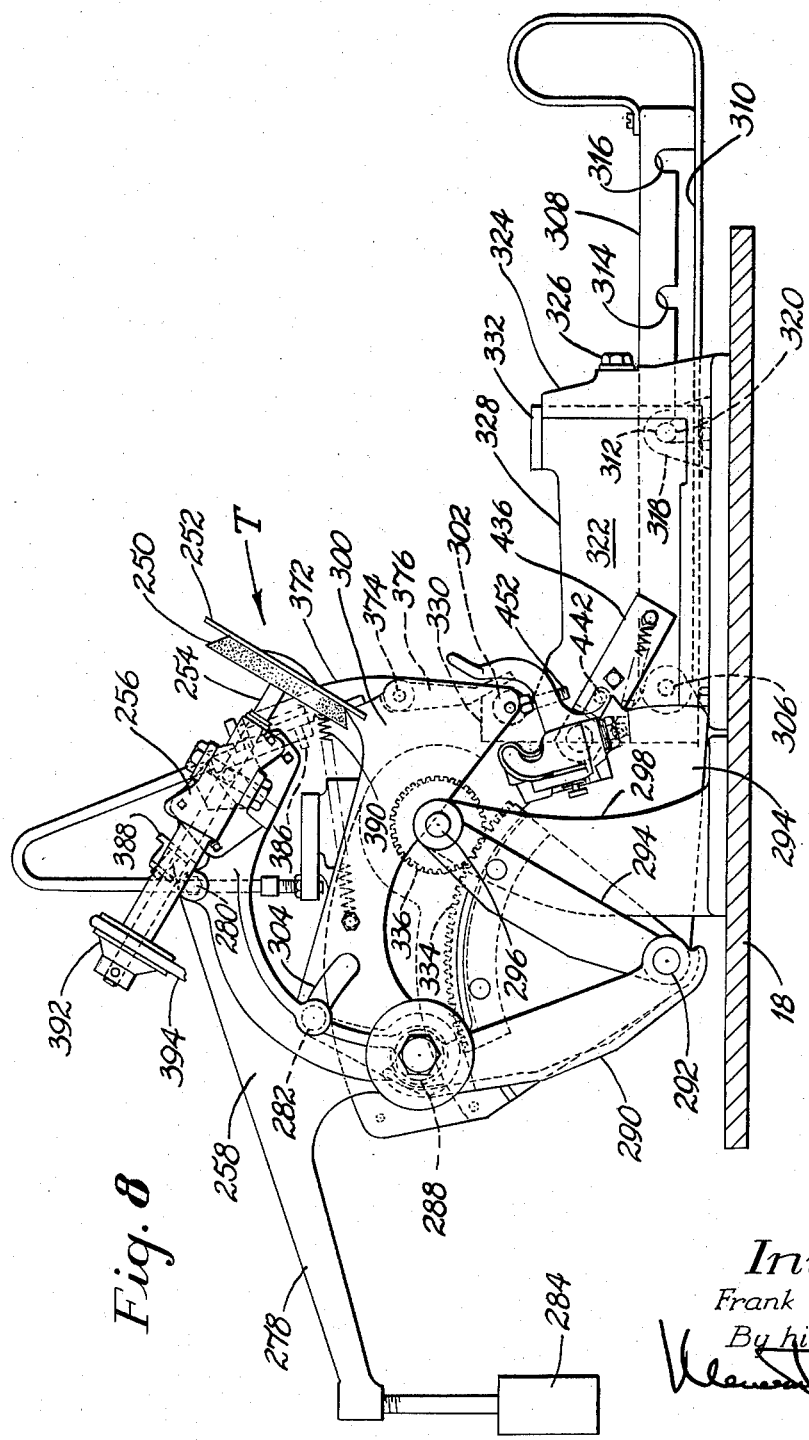

Oct. 4, 1960   F. C. CHOICE   2,954,595
MACHINES FOR OPERATING ON BLANKS OF CERAMIC WARE
Filed July 16, 1956   10 Sheets-Sheet 6
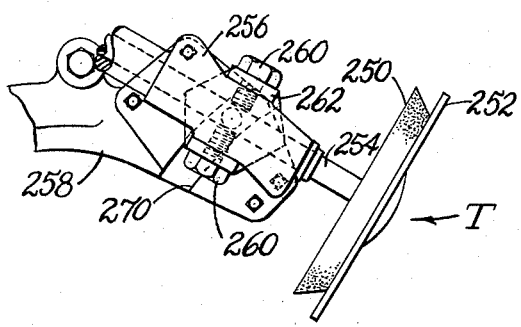
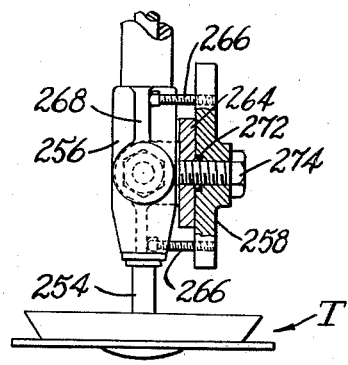
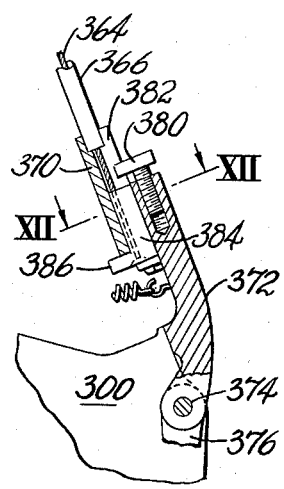
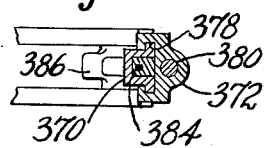
Inventor
Frank C. Choice
By his Attorney
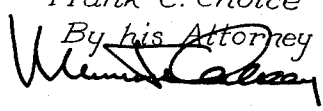

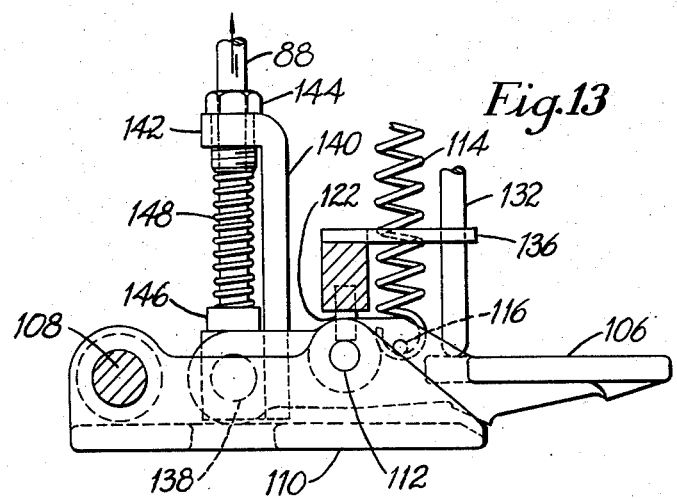
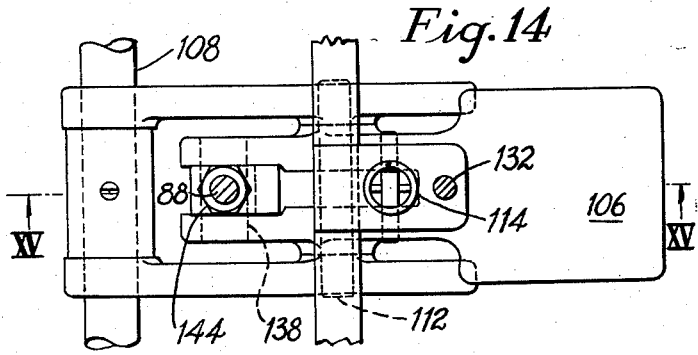
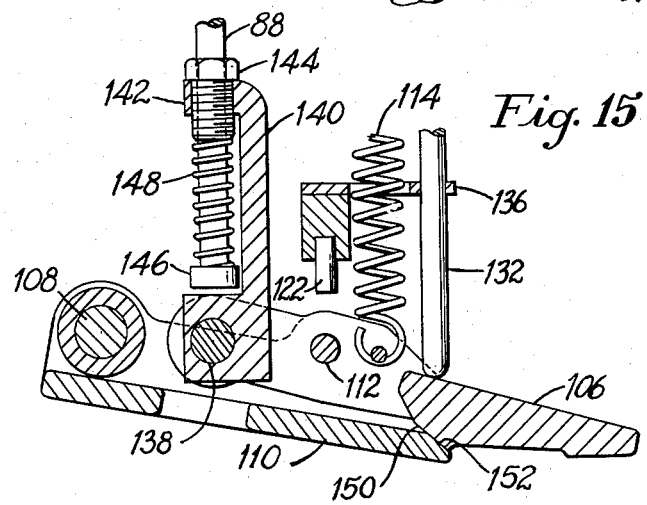

Oct. 4, 1960 F. C. CHOICE 2,954,595
MACHINES FOR OPERATING ON BLANKS OF CERAMIC WARE
Filed July 16, 1956 10 Sheets-Sheet 8

Inventor
Frank C. Choice
By his Attorney

Oct. 4, 1960
F. C. CHOICE
2,954,595
MACHINES FOR OPERATING ON BLANKS OF CERAMIC WARE
Filed July 16, 1956
10 Sheets-Sheet 9
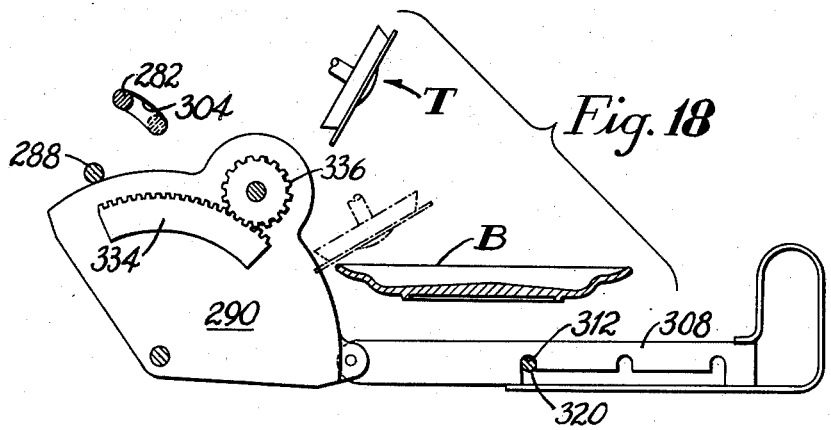
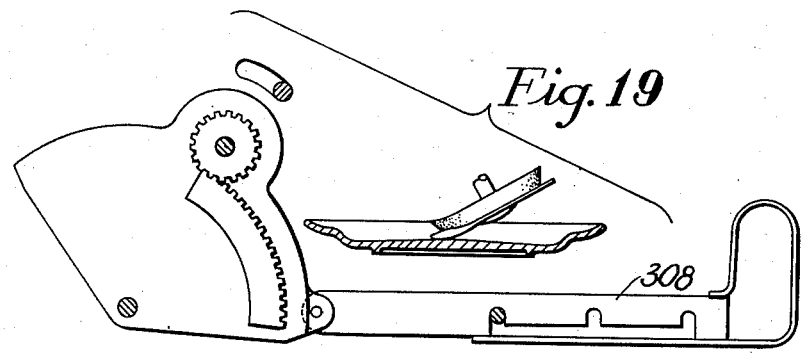
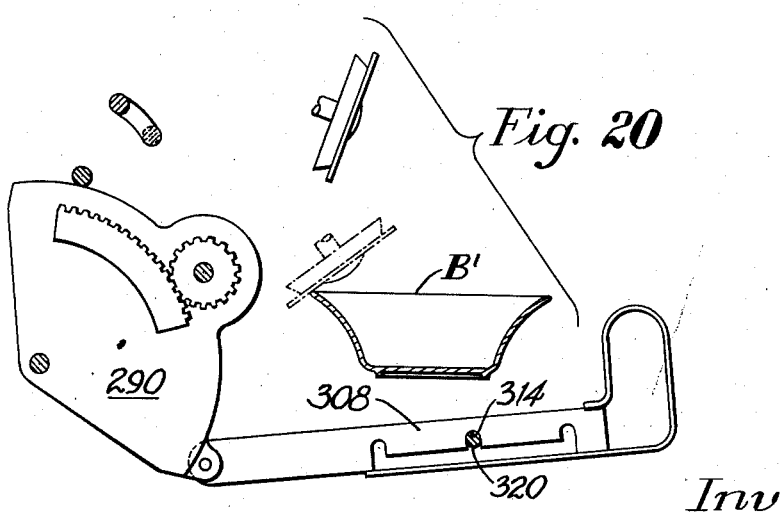
Inventor
Frank C. Choice
By his Attorney

United States Patent Office 2,954,595
Patented Oct. 4, 1960

2,954,595
MACHINES FOR OPERATING ON BLANKS OF CERAMIC WARE

Frank Coleman Choice, Leicester, England, assignor to United Shoe Machinery Corporation, Flemington, N.J., a corporation of New Jersey Filed July 16, 1956, Ser. No. 598,114

Claims priority, application Great Britain July 25, 1955

2 Claims. (Cl. 25—22)

This invention relates to machines for use in the manufacture of ceramic ware and is illustrated herein as embodied in a machine for performing fettling and towing operations on a blank of ceramic ware, one type of machine for this purpose being illustrated in application for Letters Patent of the United States Serial No. 418,969, filed March 26, 1954, in the names of Alfred M. Bentley et al., now Patent No. 2,895,205, granted July 21, 1959.

It is an object of the present invention to provide an improved machine for carrying out the operations performed by the aforementioned machine.

To this end and in accordance with a feature of the invention there is provided a rotary work support having suction means for holding a blank while the operations are being performed thereon, and a dust hood movable into and out of operative relation to the blank on the work support, movement of the dust hood into operative relation to the blank rendering the suction means operative. The work support includes a member having an annular work supporting surface engageable with the undersurface of the blank near its periphery and, in accordance with a further feature of the invention, there is provided an auxiliary support between the annular supporting member and the suction cup which is centrally disposed. This auxiliary supporting member is normally so positioned as to prevent contact of the work with the annular supporting member and, in accordance with a still further feature of the invention, includes a work engaging member movable laterally to facilitate centralizing of the blank with respect to the work support.

The above and other features of the invention including novel combinations of parts and details of construction will now be described by reference to the drawings and pointed out in the claims.

In the drawings,

Fig. 1 is a left side elevation of one form of machine embodying the invention, with certain cover plates and guards removed;

Fig. 2 is a vertical section through the work support and the driving means therefor;

Fig. 3 is a plan view of a portion of the work support with a portion thereof broken away;

Fig. 4 is a section on the line IV—IV of Fig. 3;

Fig. 5 is a front elevation, partly in section, of the upper portion of the machine;

Fig. 6 is a plan view of the machine;

Fig. 7 is a detail view, partly in section, of a portion of the drive means for the machine;

Fig. 8 is a left side elevation of the upper portion of the machine with certain parts removed;

Fig. 9 is a side elevation of a towing tool and the supporting means therefor;

Fig. 10 is a plan view, partly in section, of the structure shown in Fig. 9;

Fig. 11 is a detail view, partly in section, of a latch employed in the machine;

Fig. 12 is a section on the line XII—XII of Fig. 11;

Fig. 13 is a side elevation, partly in section, of a treadle by which the machine is controlled;

Fig. 14 is a plan view of the parts shown in Fig. 13;

Fig. 15 is a section on the line XV—XV of Fig. 14 illustrating the treadle in its fully depressed position;

Fig. 18 is a diagrammatic view illustrating the movement of the towing tool from a retracted position into the position it assumes at the beginning of a cycle of operations;

Fig. 19 is a view similar to Fig. 18 showing the positions of the parts of Fig. 18 at the end of the cycle of operations;

Fig. 20 is a view similar to Fig. 18 but showing the machine set up for work on a deep bowl, having sloping sides;

Figure 16:
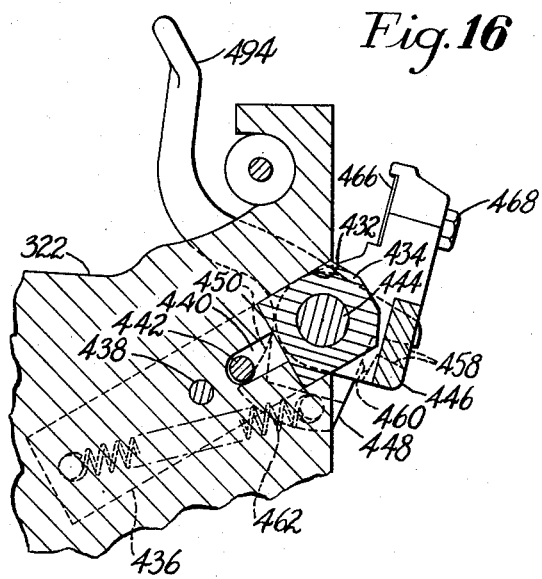
Fig. 16 is a section through a cam plate on which the fettling and edge towing tools are mounted.

As illustrated in Fig. 1 the machine comprises a frame 10 having legs 12 on the upper ends of which is supported a table 14. Projecting upwardly from the table 14 are three posts 16 which in turn support a platform 18. Bars 20 connecting the front and rear legs near their lower ends support a bracket 22 on which is mounted an electric motor 24.

Carried by the frame work 10 is a work support 26 (Fig. 2) which comprises an annular head 28 formed of plaster or other suitable material and supported on a metal disk 30. The upper edge of the head 28 is in the form of a rim 32 which has a felt covering 34 on which a plate P or other work piece to be treated rests. The disk 30 is secured by screws 36 to the flanged upper end of a sleeve 38 journaled in bearings 40, 42 in the platform 18 and the table 14, respectively. The upper end of the sleeve 38 rests on ball bearings 44. Secured to the sleeve 38 intermediate the bearings 40, 42 is a collar 46 and above that is a pulley 48 around which passes a belt 50 for transmitting power from the sleeve 38 to the operating instrumentalities of the machine as will be described.

The support is arranged to be driven first at a low speed and then at a high speed during operation of the machine. Accordingly a pair of drive gears 52, 54 are provided and are arranged to be connected at different times to the sleeve 38. The gear 52 is journaled on the bearing 42 and is held in place by a plate 56 secured to the lower portion of the bearing 42. Ball bearings 58 are interposed between the gear 52 and the table 14. The gear 54 which is substantially smaller than the gear 52 is journaled on the lower end of the sleeve 38 and rests on ball bearings 60 held in place by nuts 62 threaded on the sleeve 38. Secured to the upper face of the gear 54 is a clutch disk 64 carrying an annular friction clutch element 66. The lower face of the gear 52 carries a similar element 68. Keyed to the sleeve 38 for vertical sliding movement is a clutch member 70 having clutch elements 72, 74 engageable with the friction elements 66, 68, respectively. When the member is moved downwardly or upwardly from the position illustrated in Fig. 2 it causes rotation of the sleeve 38 and the work support at the speed of the lower gear 54 or the upper gear 52. With the clutch member 70 in its intermediate position as illustrated, the sleeve 38 and the work support 26 are at rest. For shifting the clutch member 70 vertically, rollers 76 are received between the clutch elements 72, 74 and are journaled on studs 78 carried by a yoke 80. As shown in Fig. 1 the yoke 80 is pivoted at 82 to a bracket 84 carried by the frame of the machine. The outer end of the yoke is pivoted at 86 to the upper end of a treadle rod 88, the arrangement being such that upon raising the treadle rod from a neutral position which it occupies between operating cycles, the clutch element 74 engages the friction element 68 on the gear 52 whereby the work support is rotated at low speed. With the treadle rod 88 depressed the clutch element 72 engages the friction element 66 whereupon the work support is driven at a higher speed by the gear 54.

The gears 52, 54 are rotated continuously by mechanism shown in Fig. 1. The electric motor 24 carries a drive pulley 90 connected by a belt 92 to a pulley 94 on a shaft 96 journaled in the frame of the machine. A bevel gear 98 on the shaft 96 is in mesh with a bevel gear 100 on a vertical shaft journaled in the bracket 84, this shaft carrying a large gear 102 in engagement with the gear 54 for driving this gear at high speed, and a small gear 104 for driving the gear 52 at relatively low speed. The large gear 52 is arranged to rotate at approximately 50 r.p.m. while the gear 54 is designed to rotate at approximately 500 r.p.m. to turn the work support at these two speeds, although it will be understood that by proper choice of gearing any selected speeds may be attained.

The treadle rod 88 is operated by a treadle 106 (Figs. 1 and 13 to 15) in such manner that by initial depression of the treadle the rod 88 is elevated to drive the work support at low speed and upon further depression of the treadle the rod 88 is lowered to drive the work support at high speed. Pivoted on a shaft 108 extending across the lower portion of the frame of the machine is a forwardly extending bracket 110 carrying a pivot pin 112 supporting the treadle 106. The treadle is urged in a clockwise direction about the pin 112 by a spring 114 acting between a pin 116 on the treadle and the lower end of a hooked rod 118 (Fig. 1) supported by a hook 120 on the front of the machine frame. The spring 114 acts to pull the treadle 106 and also the bracket 110 upwardly into rest positions, as shown in Fig. 13, in which the pin 112 in the bracket 110 engages a stop 122 carried by the frame of the machine. Counterclockwise movement of the treadle 106 about the pin 112 is arrested by a brake 124 (Fig. 1). This brake comprises a bell crank lever 126, one arm 128 of which carries a brake lining arranged to engage the collar 46 (Fig. 2) on the sleeve 38, the other arm of the bell crank lever being pivoted at 130 to the upper end of a vertical rod 132, adjustable in a member 134 whereby its effective length may be varied. The lower end of the rod 132 is guided by a bracket 136 having a hole through which the rod passes. The lower end of the rod bears against the upper surface of the treadle 106 forwardly of the spring 114 so that when the operator removes his foot from the treadle which is then moved into the position shown in Fig. 13, the rod 132 is moved upwardly and, through the bell crank lever 126 applies a braking force to the collar 46 on the sleeve 38 thereby bringing the sleeve and the work support to rest. When the treadle is depressed in the operation of the machine, the rod 132 falls and the lever 126 rocks in a clock wise direction under the influence of gravity to release the brake.

The rearward end of the treadle 106 carries a pivot pin 138 on which is supported an upwardly extending bracket 140 provided at its upper end with a flange 142 through which is threaded a hollow screw 144. The treadle rod 88 passes through this hollow screw 144 and carries at its lower end a collar 146 which normally rests on the lower portion of the bracket 140, as shown in Fig. 13. A spring 148 acts between the collar 146 and the lower end of the screw 144 to urge the treadle rod down. However, this spring is weaker than the spring 114, the purpose for which will appear as the description proceeds.

When the treadle 106 is first depressed, it moves in a clockwise direction about the pin 112, the spring 114 at this time acting through the treadle to maintain the pin 112 in engagement with the stop 122. This initial movement of the treadle releases the brake 124 and raises the pivot 138 carrying the bracket 140 upwardly causing upward movement of the treadle rod 88 until the clutch 70 (Fig. 2) connects the sleeve 38 to the large drive gear 52 whereupon the work support rotates slowly. Upon further depression of the treadle 106 it pivots about the pin 138 whereupon the pivot pin 112 is moved downwardly, the spring 114 acting at this time to hold the treadle rod 88 in its up position. During such further downward movement of the treadle 106 it moves clockwise with respect to the bracket 110 as the bracket itself moves clockwise upon the shaft 108 until a flat face 150 of the treadle engages a corresponding face 152 on the bracket 110 whereupon the treadle and the bracket move as a unit about the shaft 108 against the action of the spring 114. The pivot pin 138 is therefore again caused to move downwardly during this latter movement of the treadle 106 carrying the bracket 140 downwardly and acting through the spring 148 to move the treadle rod 88 downwardly and move the clutch 70 down to connect the gear 54 with the sleeve 38 to turn the sleeve and the work support at high speed. Depression of the treadle 106 may continue until the forward end thereof strikes the floor, the spring 148 yielding at this time. Upon release of the treadle 106 the parts are returned to the positions shown in Fig. 13 with the treadle rod and clutch in their neutral positions and the brake 124 applied to bring the sleeve 38 and the work support to rest.

The work support 26 includes means for assisting the operator in placing a work piece centrally upon the rim 32 and suction means for holding the work piece in place on the rim 32 during the fettling and towing operations. Screwed into the upper end of the sleeve 38 is a hollow fitting 154 (Fig. 2) slidable on which is a cup-shaped member 156 splined to the fitting 154. The cup-shaped member 156 has a peripheral flange 158 presenting a substantially horizontal flat annular upper surface (Fig. 4). An annulus 160 of metal rests upon the flange 158 and has an internal depending skirt 162 the external diameter of which is somewhat less than the internal diameter of the flange 158 whereby the annulus 160 may be adjusted laterally of the axis of the cup-shaped member 156 to a limited extent. The upper surface of the annulus is covered by an annular piece of felt 164 to provide a soft surface to receive the work when it is positioned on the work support. The annulus 160 is normally maintained in a position concentric with respect to the cup-shaped member 156 by means of three spring-pressed catches 166. Each of these catches is pivoted on a pin 168 threaded into the cup-shaped member 156 and each catch includes a lip 170 (Fig. 4) arranged to overlap the lip 162 of the annulus 160. Each of the catches is urged in a counterclockwise direction by a spring 172 thereby to maintain the catches in locking engagement with the annulus 160. The springs 172 are relatively weak but have sufficient strength to maintain the annulus 160 concentrically disposed with respect to the cup-shaped member 156 when no work piece is placed on the work support. The springs, however, are not strong enough to centralize the annulus if a work piece is resting on it nor to offer much resistance to displacement of the annulus. This permits movement of a work piece resting on the felt covering 164 laterally of the work support by slipping of the annulus 160 on the member 156 to permit the operator readily to centralize the work piece on the work support.

The cup-shaped member 156 is urged upwardly by a compression spring 174 interposed between it and the sleeve 38. This spring is strong enough to support the member 156 and the parts carried by it as well as the work piece P but not much stronger so that when the work piece is properly positioned laterally of the work support it may be pulled down and maintained in firm engagement with the covering 34 on the rim 32 by suction means which will now be described.

The suction means comprises a rubber suction cup 176 secured to the top of the hollow fitting 154 by a hollow screw 178, the suction cup limiting upward movement of the cup-shaped member 156 under the action of the spring 174. The fitting 154 is connected to a tube 180 which passes downwardly through the sleeve 38 and is connected to a valve 182. This valve is similar in construction to that illustrated and described in application for Letters Patent of the United States, Serial No. 418,969, filed March 26, 1954, in the names of Alfred M. Bentley et al. Briefly, this valve comprises a nut 184 threaded on the lower end of the sleeve 38 and has passageways 186 in communication with the tube 180 passing through the sleeve and with the atmosphere with the parts in the positions shown in Fig. 2. A ball headed pin 188 is fitted into the lower end of the nut 184 and has passageways communicating with the passageways 186. This pin is arranged to be connected to a swivel fitting which in turn is connected by a tube 190 (Fig. 1) to a suction pump 191 driven from the motor 24 by a belt 193. With the parts in the positions shown in Fig. 2 the suction is not effective to maintain the plate in position on the work support.

The passageways 186 are arranged to be closed to atmosphere so that the suction is effective in the cup 176. For this purpose a collar 192 slidable on the sleeve 38 above the valve member 182 is provided with a rubber ring 194 arranged when the collar 192 is moved downwardly to close the passageways 186 to the atmosphere. The collar 192 has a circumferential groove 196 in which are positioned rolls carried by a yoke portion of an arm 198 one end of which is pivoted at 200 on a bracket mounted on the frame of the machine. The other end of the arm 198 is connected by a ball and socket joint 202 to the lower end of a vertically extending rod 204. The upper end of this rod is screwed into a tubular member 206 (Fig. 5). The member 206 has a bore which receives a spring 208 acting between the upper end of the rod 204 and a plunger 210 having a rod 212 projecting upwardly above the member 206. The member 206 is slidably mounted in a bracket 214 secured to and projecting from one side of the platform 18 and is urged upwardly by a compression spring 216 acting between the bracket and an enlarged upper end portion of the member 206. Upward movement of the rod 204 and the member 206 is limited by a nut 217 threaded on the rod and engageable with the undersurface of the bracket. When the parts are in the positions shown in Fig. 5, the valve 182 (Fig. 2) is open to the atmosphere.

Downward movement is imparted to the rod 204 to close the valve 182 to the atmosphere by movement of a dust hood into operative relation to the work support to collect and remove dust which results from the fettling and towing operations. The dust hood comprises a sheet metal hood 218 (Figs. 1, 5 and 6) adjustably carried by an arm 220 of a lever 222 pivoted at 224 to a bracket 226 carried by the platform 18. The forward end of the arm 220 of the lever 222 has a slot 228 in which is adjustably positioned a clamping screw 229 which passes into the dust hood. The other arm 230 of the lever 222 carries a pivoted collar 232 which slidably receives an end portion of a rod 234 pivoted to the table 14 at 236. A compression spring 238 acts between the collar 232 and a collar 240 fixed to the rod 234 to maintain the lever 222 either in the position illustrated with the dust hood 218 elevated or in a position in which the dust hood is over the work. The rod 212 lies in the path of movement of the arm 220 of the lever 222 so that when the lever 222 is pivoted clockwise, as viewed in Fig. 1, to lower the dust hood, the rod 212 and consequently the rod 204 is moved downwardly pivoting the arm 198 (Fig. 2) in a counterclockwise direction whereupon the collar 196 closes the passageway 186 to the atmosphere to cause a reduction in pressure within the suction cup 176.

Figure 23:
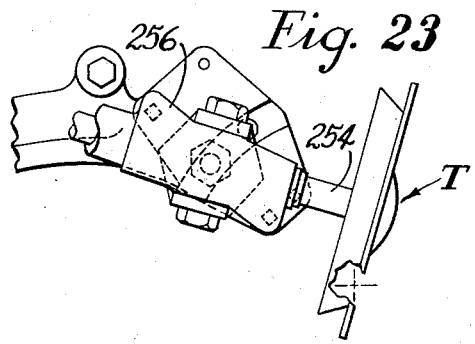
Fig. 23 is a view similar to Fig. 9 but illustrating the towing tool in a different position of adjustment.

For operating on the upper surfaces of work pieces the machine has a towing tool T (Figs. 8, 9 and 10) comprising a circular brush 250 having radically projecting bristles and a circular piece of felt 252 or like material which are carried by a shaft 254. This shaft is journaled in a housing 256 adjustably mounted on the forwardly projecting portion of a carrier 258. The housing 256 is connected by a pair of alined screws 260 between ears 262 of a slide 264. A pair of stop screws 266 threaded into the carrier 258 are arranged to engage flanges 268 on the housing 256 to maintain the housing in the proper position of adjustment about the axis of the screws 260. The slide 264 is adjustably supported on the forward portion of the carrier 258 which is provided with an arcuate groove 270 which receives an arcuate tongue 272 on the slide. A screw 274 passes through one of a pair of holes in the carrier 258 and into a tapped hole in the slide 264 to maintain the slide in either of two positions along the groove 270. The center of curvature of the groove 270 is in the locality of the operation of the tool T when operating upon a work piece, as shown by the cross in Fig. 23, where one portion of the tool has been broken away. Fig. 23 shows the position of the tool with the slide in one of its two positions, and Fig. 9 shows the position of the tool with the slide in its other adjusted position.

The carrier 258 comprises a pair of arms 276, 278 (Fig. 6) connected by rods 280, 282. The housing 256 in which the shaft for the towing tool is mounted is carried by the arm 276 and the arm 278 projects rearwardly from the machine and carries a counterweight 284. The arms 276, 278 are pivoted on pins 286, 288 (Fig. 5) so that the carrier 258 with the towing tool T is swung about the axes of these pins. The pins 286, 288 are in turn carried by a swinging support 290 (Fig. 8) pivoted on a pin 292 connecting the support 290 to the lower end of a depending link 294 which is in turn carried by a shaft 296 supported in a bracket 298 mounted on the platform 18.

Also mounted on the pin 288 is a cam follower arm 300 (Fig. 5) comprising a pair of spaced plates between the forward ends of which is journaled a cam follower roll 302. The rearward portions of the plates of the cam follower arm 300 are provided with arcuate slots 304 (Fig. 8) through which the rod 282 connecting the arms 276, 278 of the carrier 258 passes. Thus rocking of the carrier 258 with respect to the cam follower arm 300 is limited. The weight 284 at the rearward end of the arm 278 is heavy enough normally to maintain the carrier 258 in the position illustrated in Fig. 8 relative to the cam follower arm 300 with the rod 282 at the rearward end of the slots 304 but the weight is not heavy enough to lift the cam follower arm 300.

The link 294 has a forwardly projecting portion which is pivotally connected at 306 to a forwardly extending handle 308 having a slot 310 into which open three recesses 312, 314, 316. The handle 308 extends ears 318 carried by the platform 18 (Fig. 6) and these ears support a pin 320 which passes through the slot 310 in the handle and is arranged to be received in any one of the three recesses in the handle to locate the handle in any one of three positions. Thus the depending link 294 and the swinging support 290 may assume any one of three positions depending upon the adjustment of the handle 308.

The cam roll 302 is arranged for engagement with the upper surface of a stationary cam plate 322 (Fig. 8) supported in a cam plate holder 324 which is in turn carried by the platform 18. The cam plate 322 is removably held in the holder 324 by a screw 326 and can be readily replaced by a cam plate having a different upper cam surface 328 to accommodate work pieces of different contours. The cam surface 328 is preferably of substantially the same contour as the work piece to be operated upon, taken along a radius of the upper surface of the work piece. The rearward portion of the cam plate has an abutment 330 to determine the rest position of the cam follower arm 300 and at its forward end the cam plate is provided with a stop 332 for a purpose which will appear as the description proceeds. The cam surface 328 is substantially parallel to and on substantially the same level and at the same distance from the pins 286, 288 as the upper surface of a work piece on the work support 26.

In initiating the operation of the machine the operator, using the rod 280 as a handle rocks the carrier 258 about the axes of the pins 286, 288 to bring the rod 282 to the forward end of the slots 304 in the cam follower arm 300, following which the swinging support 290 (Fig. 8) is rocked in a clockwise direction and the cam follower arm 300 moves the cam roll 302 along the cam surface 328.

For thus moving the swinging support 290 it is provided with a gear segments 334 (Figs. 5 and 8) which meshes with a gear 336 fixed on a shaft 338 which is on the same axis as the shaft 296, so that the link 294 when adjusted by the handle 308 to adjust the pivot for the support 290 swings about the axis of the shaft 338. This shaft is journaled in bearings in a housing 340 carried by the platform 18 at the right side of the machine. Secured to the shaft 338 within the housing 340 is a toothed clutch member 342 with which cooperates a complementary toothed clutch member 344 freely rotatable on the shaft. Integral with the clutch member 344 is a worm gear 346 adapted to be driven by a worm 348 (Fig. 7) secured to the upper end of a vertically extending shaft 350 having secured to its lower end a pulley 352 driven by the belt 50 from the pulley 48 (Fig. 2) carried by the sleeve 38. Thus it will be seen that as long as the sleeve 38 is rotated the worm 348 and the worm gear 346 will likewise be operated at speeds proportional to that of the sleeve 38.

For moving the worm gear 346 and the associated clutch member 344 along the shaft 338 to engage the clutch member 342 and cause rotation of the shaft, a bell crank lever 356 (Fig. 5) pivoted at 358 in the upper part of the housing 340 is provided. This bell crank lever includes a depending yoked arm carrying rolls 360 received by a circumferential groove in a member 362 carried by the worm gear 356. The other arm of the bell crank lever 356 is connected to a Bowden wire 364 passing through a sleeve 366, one end of which is secured to a plate 368 carried by the top of the housing 340. The other end of the sleeve 366 is secured to a slide 370 (Fig. 11) mounted on a latch 372 pivoted at 374 to the cam follower arm 300. The latch 372 has a depending arm 376 (Fig. 8) arranged to engage the stop 332 of the cam plate 322 when the cam roll 302 reaches the forward end of the cam surface 328.

The upper portion of the latch 372 is provided with grooves 378 (Fig. 12) which receives flanges on the slide 370 and the position of the slide 370 with respect to the latch 372 is determined by a screw 380 threaded into the upper end of the latch, the head of the screw being received within notches in the slide so that upon turning the screw the slide is movable vertically with respect to the latch. The slide 370 has a centrally arranged vertically extending channel 382 in which is mounted for sliding movement a block 384 secured to the Bowden wire 364. The block 384 has a laterally extending lip 386 engageable with the lower end of the slide 370. When the block 384 is moved downwardly with respect to the slide 370 it pulls the Bowden wire 364 rocking the bell crank lever 356 (Fig. 5) in a clockwise direction engaging the clutch member and causing rotation of the shaft 338.

This downward movement of the block 384 to cause engagement of the clutch members is effected by the carrier 258 when the carrier is rocked by the operator about the axis of the pins 286, 288 to bring the rod 282 to the forward end of the slots 304 in the cam follower arm 300. For thus moving the block 384 downwardly, the carrier 258 carries a trip element 388 (Fig. 8) movable into engagement with the lip 386 of the block 384 to depress the block. The latch 372 is urged in a counterclockwise direction, as viewed in Figs. 8 and 11, by a spring 390 so that when the block 384 is depressed, the trip element 388 is held between the lip 386 and the lower end of the slide 370 thereby to hold the Bowden wire 364 in the position to which it has been moved and maintaining the clutch members in engagement, and also preventing the weight 284 from rocking the carrier 258 back into the position illustrated in Fig. 8.

With the clutch members thus engaged the gear 336 rotates and by its engagement with the segment 334 causes the link 290 to rock about its pivot 292, thus causing the cam follower arm 300 to be moved by the rod 282 so that the cam roll 302 rides along the surface 328. The carrier 258, the cam follower arm 300, the link 290, and the tool T move as a unit, relative movement between the cam follower arm 300 and the carrier 258 being prevented by engagement of the trip element 388 in the latch 372. The unit, however, rests on the cam surface only under its own weight, being pivoted about the axis of the pins 286, 288. Fine adjustment of the carrier 258 with respect to the cam follower arm 300 is effected by adjusting the screw 380 (Fig. 11) thereby adjusting the relative positions of the tool T and the cam roll 302. Thus the tool T is carried along a path radial of the blank and following its contour. Since the blank is rotating the tool actually operates along a spiral path.

During this operation of the tool over the surface of the blank the tool is rotated. For this purpose the shaft 254 carries at its rearward end a pulley 392 (Fig. 8) over which passes a belt 394 which engages guide pulleys 396 (Fig. 5) carried by the pin 286. The belt also passes around guide pulleys 397, 398 (Fig. 1) and over a drive pulley 400 carried by a shaft 402 journaled in a bracket 404 carried by the platform 18. The shaft 402 carries a pulley 406 connected by a belt 408 to a pulley 410 on the drive shaft 96. The guide pulley 397 is journaled in a bracket 412 mounted on the table 14 and the guide pulley 398 is mounted at the rearward end of a bar 414 which carries at its forward end a roll 416 resting on the table 14. This roll is free to slide in a guideway formed by posts projecting upwardly from the table 14 and connected by a horizontally-extending bar 418. The bar 414 is pivoted intermediate its ends at 420 to the forward end of a link 422, the rearward portion of which is pivoted to the bracket 412. The weight of the bar 414 and of the pulley 398 keeps the belt 394 at a substantially constant tension irrespective of movements of the towing tool T.

When the towing tool T reaches the center of the blank being operated upon, the depending arm 376 of the latch 372 engages the stop 332 on the cam plate 322 whereupon the latch is rocked in a clockwise direction about the pivot 374. This movement of the latch releases the trip element 388 from engagement with the latch between the lip 386 and the slide 370 (Fig. 11) whereupon the carrier 258 is permitted to rock counterclockwise (Fig. 8) under the influence of the weight 284 until the rod 282 reaches the left end of the slots 304. At the same time the lip 386 is free to return to the position shown in Fig. 11 being thus moved by a torsion spring 424 (Fig. 5) acting on the bell crank lever 356 to move the lever in a counterclockwise direction into the position shown in Fig. 5 with the clutch members 342, 344 disengaged. Carried by the shaft 338 is a pulley 426 to which is secured a wire 428 wound several times around the pulley and connected at its lower end to a spring 430, the lower end of which is secured to the floor. Upon separation of the members 342, 344 the spring acting through the wire 428 rotates the shaft 338 in the opposite direction to that in which it was given by the worm gear 346 thereby returning the swinging support 290, the carrier 258 and the cam follower arm 300 to the positions shown in Fig. 5, with the cam roll 302 on the cam follower arm 300 in engagement with the abutment 330 at the rearward portion of the cam plate 322.

The relative positions of the swinging support 290, the tool T, and a work piece comprising a blank B in the form of a dinner plate or the like, are illustrated in Figs. 18 and 19, the work support being omitted for clarity of illustration of the other parts. In Fig. 18 the tool T and the rod 282 are shown in full lines in the positions which they assume before the operating cycle of the machine starts, while the broken lines indicate the positions of the same parts when the operator has caused the trip element 388 to be locked by the latch 372 at the beginning of the operating cycle of the machine. The positions of the parts at the end of the operating cycle are shown in Fig. 19. It will be noted that the pin 320 is in the recess 312 of the handle 308.

The relative positions of the parts when the machine is set up for operation on a blank B' for a sugar bowl or the like having sloping sides, are illustrated in Fig. 20. The handle 308 has been moved so that the pin 320 is now in the recess 314 and it will be noted that the swinging support 290 has been moved thereby in a clockwise direction. The housing 256 carrying the shaft 254 for the tool T has been adjusted into the position illustrated in Fig. 23.

Figure 21:
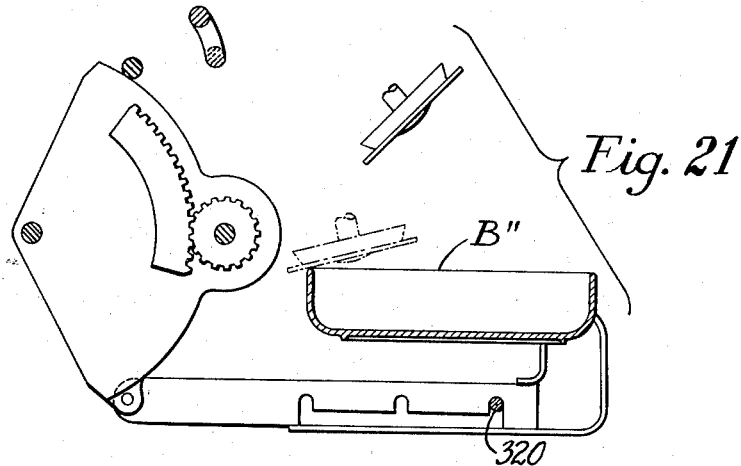
Fig. 21 is a view similar to Fig. 18 showing the machine set up for operation on a shallow vertical-sided bowl.
Figure 22:
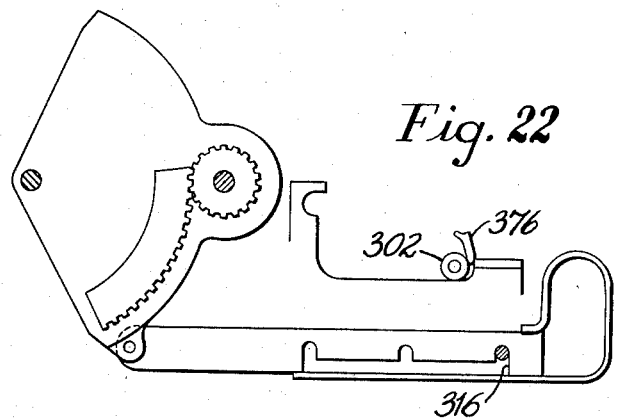
Fig. 22 is a diagrammatic view showing the positions of the parts of Fig. 21 at the completion of the cycle of operations, certain parts shown in Fig. 21 being omitted to illustrate other parts.

Figs. 21 and 22 correspond to Figs. 18 and 19 and represent the relative positions of the parts of the machine when adjusted for operation on a blank B'' for a shallow, steep-sided bowl. The housing 256 is adjusted as illustrated in Fig. 23 and the pin 320 is located in the recess 316. The work piece and the tool have been omitted in Fig. 22 to illustrate the position and shape of the cam plate used and also to illustrate the position of the cam roll 302 and the position of the arm 376 of the latch 372 as the towing tool reaches the center of the blank.

Means for fettling and towing the edge of a work piece will now be described with particular reference to Figs. 5, 8, 16 and 17. The cam plate 322 (Figs. 8 and 16) is provided with a slot 432 in which is mounted a holder 434 for the supports for the fettling and towing tools. The holder 434 is in the form of a block slidable in the slot 432 and is provided with legs 436 engageable with opposite faces of the cam plate 322. The holder is held in a predetermined position in the slot by a screw 438 which passes through holes in the legs 436 and through a hole in the cam plate 322. The slot 432 has an extension 440 to provide clearance for a pin 442 which passes through the legs 436 and projects beyond from the sides thereof, for a purpose to be described.

The holder 434 carries a pivot pin 444 on which are pivoted a fettling tool support 446 and a towing tool support 448. Clockwise movement of the towing tool support 448 is limited by engagement of a surface 450 of the support engaging the pin 442, and counterclockwise movement of the support is limited by an adjustable stop screw 452 (Fig. 8) engaging the pin 444. Pivotal movement of the fettling tool support 446 is similarly limited by a surface 454 of the support engageable with the pin 442 (Fig. 5) and by a screw 456. The supports 446, 448 also include cooperating surfaces 458, 460 (Fig. 16) to allow only a small amount of relative pivotal movement to take place between the supports. The supports are normally maintained in inactive positions by springs 462, 464 (Fig. 5) which act between the supports and pins carried by the legs 436 of the holder 434.

Carried by the support 446 is a fettling tool F which comprises a strip of spring steel 466 having a V-shaped notch at one end, the other end of the strip being secured to the support by a screw 468 (Fig. 16).

Figure 17:
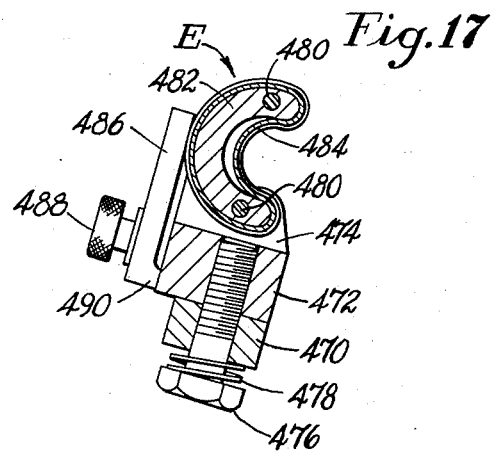
Fig. 17 is a section through the edge towing tool.

The support 448 carries an edge towing tool E (Fig. 17). For this purpose a bar 470 (Figs. 5 and 17) is secured to the support 448 and adjustably secured to the outer end of this bar is a block 472 having a U-shaped recess 474. The block 472 is adjustably secured to bar 470 by a screw 476 there being a spring washer 478 held between the head of the screw and the bar 470 so that the block 472 can be turned against the frictional resistance between it and the bar 470. Secured within the U-shaped recess 474 by screws 480 is a semicircular member 482 covered with a similarly shaped band 484 of towing material which may, for example, be formed of emery paper with a flexible rubber backing. The band 484 is long enough to form a loop within the member 482 and the edge of the work piece is engaged by this loop during the edge towing operation. The band 484 is held in position by a finger 486 which bears against the band at the back of the member 482. The finger is secured to the block 472 by a screw 488 and has an inturned lip 490 below the screw so that tightening of the screw increases the pressure of the finger on the band. By loosening the screw the band 484 may be turned to present a fresh portion thereof to the work piece.

The fettling tool support 446 is provided with a handle 492 by which the tool may be moved into and out of operative position and the towing tool support 448 is provided with a handle 494 for the same purpose. When the machine is set up for operation upon a particular type of work piece, a cam plate such as the plate 322 (Fig. 8) corresponding to the shape of the work piece is mounted in the holder 324, the cam plate having a slot 432 and a hole for the screw 438 so positioned that when the cam plate is mounted in its holder and the holders for the fettling and edge towing tools are mounted thereon the tools are in such positions that upon rocking their supports about the pivot pin 444 they will be brought automatically into the desired operative relation to the edge of the work piece.

In the operation of the machine the following steps are carried out by the operator, the motor 24 and the suction pump 191 being in operation. It will be assumed that a blank B for a plate is to be operated upon and that the proper cam plate is installed in the machine and the handle 308 is in the position of Fig. 18 with the pin 320 in the recess 312. The plate is placed upon the felt-covered rim of the work support 26 (Fig. 2) and the treadle is depressed slightly to cause rotation of the work support at a slow rate. The blank is then centralized by pushing it down upon the rim 32 of the work support and the blank is held down by the operator with his right hand and the suction hood 218 is then lowered with his left hand. This movement of the suction hood closes the passageways 186 (Fig. 2) of the valve 182 to the atmosphere whereby the suction within the cup 176 holds the plate firmly on the work support. The handle 492 (Fig. 5) is then depressed to bring the fettling tool into engagement with the edge of the blank after which the handle is released and the other handle 494 is depressed to bring the edge towing tool into engagement with the blank. At this time the treadle is fully depressed causing rotation of the work support at high speed and the rod 280 is drawn forwardly until the tripping element 388 (Fig. 8) engages the lip 386 (Fig. 11) of the latch 372 whereupon the carrier 258 is held in operative position and the clutch elements 342, 344 (Fig. 5) are engaged causing the operating cycle of the machine to begin.

The gear 336 (Fig. 8) rotates to drive the gear segment 334 causing the cam roll 302 to ride along the surface 328 and the tool T, the heightwise position of which is controlled by the cam roll, is carried from the periphery of the blank to a central portion of it. At this time the depending portion 376 of the latch 372 engages the stop 332 releasing the trip element 388 whereupon the weight 284 raises the tool T and at the same time the clutch elements 342, 344 are disengaged and the tool T is moved rearwardly by the spring 430 until the cam roll 302 engages the abutment 330 thus bringing the cycle of operations to an end. The treadle is then released and the dust hood is raised. Release of the treadle actuates the brake 124 (Fig. 1) to stop the work support and raising of the dust hood opens the valve 182 (Fig. 2) under the action of the spring 216 (Fig. 5) to relieve the suction on the blank. The operator then removes the blank whereupon the annulus 160 is centralized upon the member 156 under the action of the springs 172, and the machine is ready for another cycle of operations on a similarly shaped work piece.

When it is desired to operate upon a work piece of different shape and size, the cam plate 322 will be replaced by an appropriately contoured cam plate with a suitably positioned slot for the supports for the fettling and edge towing tools. It may also be desirable to substitute a different size work support from that illustrated in Fig. 2. It will be understood that when a smaller work piece is being operated upon, the operative surface of the cam will be correspondingly smaller thus reducing the advancing movement of the towing tool T and reducing the time for the operating cycle of the machine.

The cup-shaped member 156 and the annulus 160 (Figs. 2-4) have been described with particular reference to their function in assisting the operator to centralize a work piece upon the work support. In addition, they provide some support under the action of the spring 174 for the central portion of the work piece thereby reducing the risk of damage to the work piece which might otherwise occur by the application of suction to the central portion while the work piece is supported only around its margin on the rim 32.

Having thus described the invention what I claim as new and desire to secure by Letters Patent of the United States is:

1. In a machine for operating on circular blanks of ceramic ware, a work support comprising an annular supporting member engageable with the undersurface of a blank adjacent to its periphery, a suction cup concentric with said supporting member and engageable with a central portion of the blank, an annular auxiliary supporting member between said suction cup and said first-named supporting member and arranged to support the blank between the zones of engagement of the suction cup and the first supporting member, means mounting said auxiliary supporting member for axial movement relative to said first-named supporting member and to said suction cup and for lateral movement relative thereto, means normally maintaining said auxiliary supporting member concentric with respect to said first supporting member and to said suction cup, and means normally maintaining said auxiliary supporting member in an axial position relatively to said first supporting member and to said suction cup such that a blank supported thereby is maintained out of contact with the first supporting member and with the suction cup until an external force is applied to the blank.

2. In a machine for operating on circular blanks of ceramic ware, a work support comprising an annular supporting member engageable with the undersurface of a blank adjacent to its periphery, a suction cup concentric with said supporting member and engageable with a central portion of the blank, an annular auxiliary supporting member between said suction cup and said first-named supporting member and arranged to support the blank between the zones of engagement of the suction cup and the first supporting member, means mounting said auxiliary supporting member for axial movement relative to said first-named supporting member and to said suction cup and for lateral movement relative thereto, means normally maintaining said auxiliary supporting member concentric with respect to said first supporting member and to said suction cup, means normally maintaining said auxiliary supporting member in an axial position relatively to said first supporting member and to said suction cup such that a blank supported thereby is maintained out of contact with the first supporting member and with the suction cup until an external force is applied to the blank, and means mounting said supporting members and said suction cup for conjoint rotation.

References Cited in the file of this patent

UNITED STATES PATENTS

| | | |
|---|---|---|
| 1,384,278 | Slocombe | July 12, 1921 |
| 1,759,058 | Miller | May 20, 1930 |
| 1,850,939 | Miller | Mar. 22, 1932 |
| 1,977,386 | Holes | Oct. 16, 1934 |
| 1,982,592 | Dobyne | Nov. 27, 1934 |
| 2,203,572 | Johnson | June 4, 1940 |
| 2,231,762 | Johanson | Feb. 11, 1941 |
| 2,308,403 | Terry | Jan. 12, 1943 |
| 2,380,509 | Emerson | July 31, 1945 |
| 2,462,707 | Allen | Feb. 22, 1949 |
| 2,587,271 | Allen et al. | Feb. 26, 1952 |
| 2,612,729 | Walley et al. | Oct. 7, 1952 |
| 2,751,718 | Falkman et al. | June 26, 1956 |
| 2,755,531 | Arelt | July 24, 1956 |